(12) United States Patent
Hopper

(10) Patent No.: US 8,025,948 B2
(45) Date of Patent: Sep. 27, 2011

(54) ABSORBENT DEVICE FOR WASTE FAT, OIL, GREASE AND LIQUID

(75) Inventor: Gayland G. Hopper, Murfreesboro, AR (US)

(73) Assignee: Green Revolution, Inc., Nashville, AR (US)

( * ) Notice: Subject to any disclaimer, the term of this patent is extended or adjusted under 35 U.S.C. 154(b) by 328 days.

(21) Appl. No.: 12/387,742

(22) Filed: May 7, 2009

(65) Prior Publication Data

US 2009/0280293 A1 Nov. 12, 2009

Related U.S. Application Data

(60) Provisional application No. 61/126,846, filed on May 8, 2008.

(51) Int. Cl.
*B32B 3/10* (2006.01)
(52) U.S. Cl. .................................... 428/66.7; 428/136
(58) Field of Classification Search ................. 428/66.7, 428/81, 84, 136; 210/924
See application file for complete search history.

(56) References Cited

U.S. PATENT DOCUMENTS
6,365,214 B1 4/2002 Kirk

*Primary Examiner* — Alexander Thomas
(74) *Attorney, Agent, or Firm* — Lynn E. Barber

(57) ABSTRACT

A device is provided to collect waste oil, grease or other liquids from skillets, pots, pans or other area of needs with a method to transporting the device without contaminating hands with waste oil, grease or other liquids collected by the device. The device is made of absorbent materials and has a circular shape with opposed tabs and slits through which the tabs are pulled to form handles.

8 Claims, 2 Drawing Sheets

ABSORBENT DEVICE FOR WASTE FAT, OIL, GREASE AND LIQUID

CROSS-REFERENCE TO RELATED APPLICATIONS

This application claims priority from U.S. provisional application Ser. No. 61/126,846, filed May 8, 2008.

BACKGROUND OF THE INVENTION

1. Field of the Invention

The present invention is in the field of waste management, and more particularly, the present invention relates to apparatuses and methods of disposing of waste oil, grease or other waste liquids.

2. Description of the Related Art

Many millions of gallons of oil, such as cooking oils and motor oils, are used each day for heating, cooking, lubricating and other purposes. Disposing of used oil, such as in the home cooking environment, is often messy, and can be hazardous as well, if the oil is hot. There are many methods of disposing of waste oil and other waste liquids, many of which are damaging to the environment or to plumbing or septic systems, or may make environmental surfaces such as roads and sidewalks dangerous to traverse. Disposal of free oils and other waste liquids in landfills and dump sites can result in movement of the oils and contamination of the ground and of ground water.

It is therefore of great value to have devices and methods for safe disposal of oils and other waste liquids. One example of a device designed for such disposal is found in U.S. Pat. No. 6,365,214 of Kirk, which discloses an apparatus for absorbing oils that comprises an oil-impermeable outer layer, housing an oil-absorbent core, and a handle. The device of Kirk preferably has at least one inlet fitable with a filter or sealable. The handle is preferably a string and is connected to the outer layer.

There a need for a simpler, less expensive absorbent device for absorbing oils and other waste liquids.

It is therefore an object of the invention to provide a device that is simple to manufacture using a one-cut process from the selected desired absorbent material. It is a further object of the invention to provide an absorbent device with opposing tabs that may be inserted through slits to facilitate the placement and removal of the device from the area if needed, more specifically a cooking skillet or pan.

Other objects and advantages will be more fully apparent from the following disclosure and appended claims.

SUMMARY OF THE INVENTION

The present invention is a device to collect waste oil, grease or other liquids from skillets, pots, pans or other area of needs with a method to transporting the device without contaminating hands with waste oil, grease or other liquids collected by the device. The device is made of absorbent materials and has a circular shape with opposed tabs and slits through which the tabs are pulled to form handles.

Other objects and features of the inventions will be more fully apparent from the following disclosure and appended claims.

DETAILED DESCRIPTION OF THE INVENTION AND PREFERRED EMBODIMENTS THEREOF

The present invention is a device to collect waste oil, grease or other liquids from skillets, pots, pans or other areas of need with a method to transporting the device without contaminating hands with waste oil, grease or other liquids collected by the device. The device of the invention is a flat, planar device generally circular in shape with two tabs protruding outwardly from opposite sides of the generally circular shape.

Figure 1:
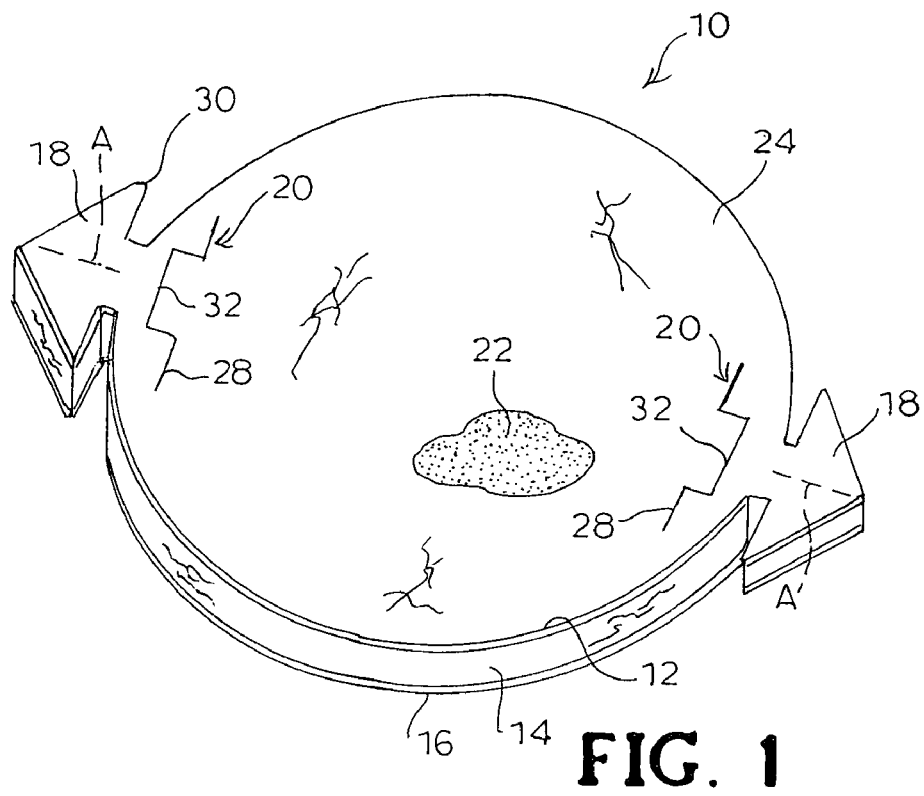
FIG. 1 is a perspective side view of the absorbent device of the invention.
Figure 2:
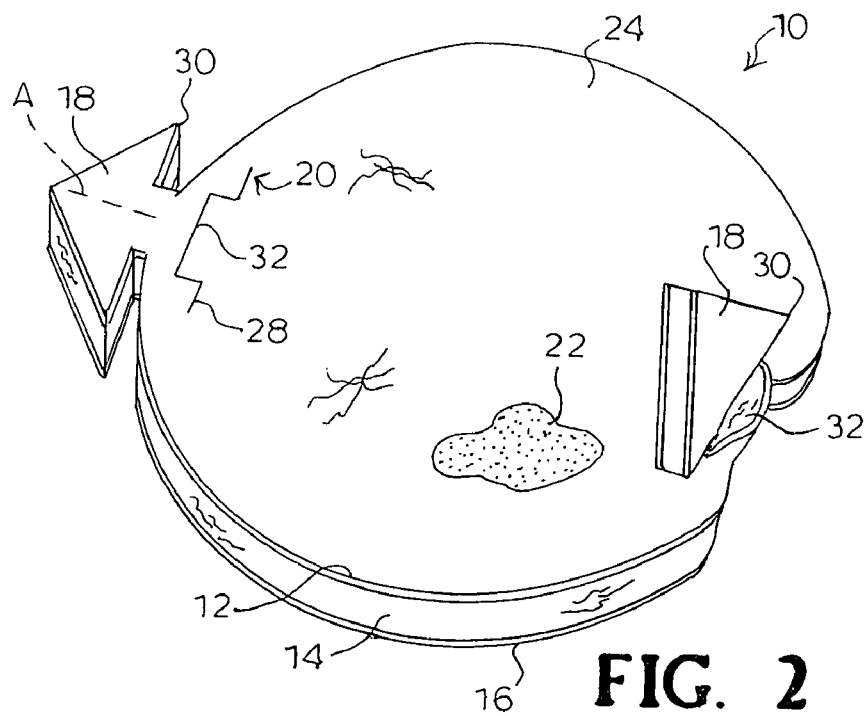
FIG. 2 is a perspective side view of the absorbent device of the invention showing one of the tabs bent upward to form a handle.

Referring now to the invention in more detail, the device 10 of the invention is made of a laminated absorbent material. In the preferred embodiment shown in FIGS. 1 and 2, the device 10 has three parallel layers: a first outer layer 12, an inner layer 14, and a second outer layer 16. While all three layers preferably have the capability of absorbing fats and oils and other waste liquids, it is particularly important that the second generally thicker inner layer 14 be absorbent. While the preferred device 10 of the invention preferably has these three layers, it is within the scope of the invention to have additional layers as desired, which may be particularly useful for absorbing large amounts of oil, or there may be fewer layers so long as there is at least one absorbent layer and the device is structurally sturdy enough to hold together during use, which is provided in the preferred embodiment by the outer layers.

To form the device of the invention, one or more devices are cut from a larger multi-layered laminated flexible sheet using a one-cut rotary die process as known in the art. A preferred laminate is EVERSOAK™ heavy weight absorbent pad (Sellars Co., Milwaukee, Wis.), which is ⅜ inch thick. Essentially all of this thickness is due to the thickness of the inner layer 14, with the first and second outer layers 12, 16 being approximately paper-thin.

The sheet of laminate is preferably cut into the form shown, which is preferably a generally circular shape 24, with opposed tabs 18 protruding outward on each side of the circular shape, with the tabs 18 being integral and co-planar with the circular portion of the device. As used herein, the term "circular shape" includes slight variations in a circular shape, such as elongated circles (ovals).

In more detail, first and second outer layers 12, 16 are preferably absorbent scrim layers through which the waste liquids are transferred to inner layer 14 which is sandwiched between first outer layer 12 and second outer layer 16. The second outer layer 16 on the opposite side of the inner layer 14 as the first outer layer 12 has the same dimensions as the first outer layer 12 allowing the waste liquids to be transferred from either side of the device to inner layer 14. The inner layer 14 has extra absorbent capacities which allow the inner layer 14 to capture the waste liquid 22.

In the preferred embodiment of the invention, two tabs 18 are provided to allow placement or removal of device from pan, skillet or other area of need. Each tab 18 is preferably in the form of an arrowhead-shaped triangle that is symmetric about a central axis A and is directly opposite the other tab 18. As discussed in more detail below, the arrowhead-shape makes it easy to grasp tab 18 so that tab 18 may be folded downward and then pulled up and inserted through slit 20 to form the upwardly projecting handles for easy placement or removal from a skillet, pan or other area of need. A preferred size arrangement for a device 20 having a diameter of about 7.85 in (19.9 cm) is tabs that are 3.12 in (7.9 cm) wide at their widest point and about 1.5 in (3.8 cm) from their base to their tip.

While two arrowhead-shaped tabs 18 are preferred, the device may be modified to have additional tabs 18, or may have differently shaped tabs, so long as they are easily grasped and inserted through slit 20 as discussed below and are structured so that they do not easily slip out after being inserted through slit 20.

As mentioned, the device further includes two slits 20 each of which is cut through all three layers 14, 16, 18 of the device 10 close to and with a portion as discussed below that is generally perpendicular to central axis A of tab 18 to allow tab 18 to be folded downward and then pulled upward through the closest slit 20 to form upright handles. Slit 20 is preferably not just a linear slit, but preferably has a rectangular central portion, with three sides of the rectangle 26 being cut and the fourth (bottom) side farthest from the tab 18 not being cut. The three cut sides include two shorter sides, preferably about 0.73 in (1.85 cm) long and a longer side 32 between the two shorter sides and perpendicular to axis A of the tab 18 as shown that is 1.25 in (3.18 cm) long. There are perpendicular side wings 28 extending from each end of the rectangular form for about 0.5 in (1.27 cm). The top of the rectangular form 26 is closest to tab 18 about 0.4 in (1 cm) away from the base of the tab 18 and is the main portion of the slit that is perpendicular to the central axis A of tab 18 through which tab 18 is pulled. While the preferred slit 20 has the shape described herein, other slit shapes that provide an opening that is sufficiently flexible and located and sized to enable easy insertion of tab 18 and also enable tab 18 to be retained in the slit in a generally upright position as shown in FIG. 4 may be used.

Figure 3:
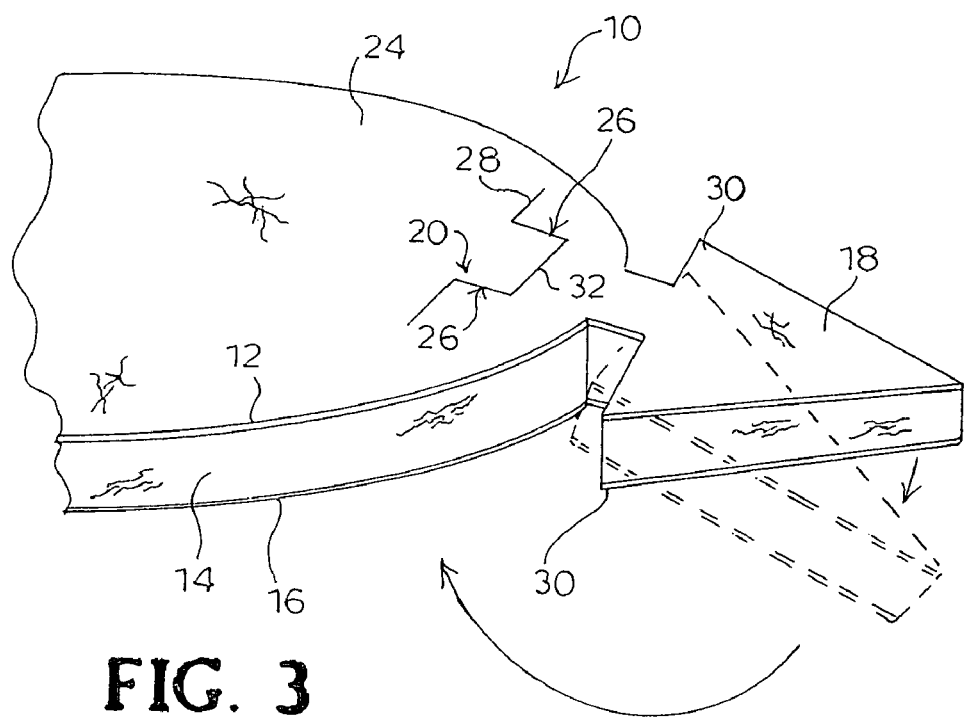
FIG. 3 is a partial perspective view of the absorbent device showing the beginning position of bending a tab for insertion into a slit.
Figure 4:
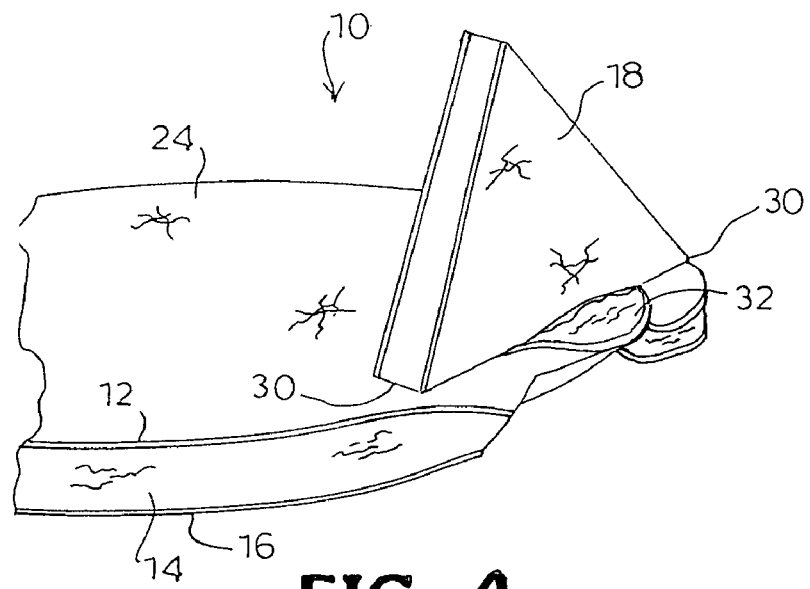
FIG. 4 is a partial perspective view of the absorbent device showing a tab inserted through the slit.

As shown in FIGS. 3 and 4, to use the device 10, each tab 18 is formed into an upright handle by bending tab 18 toward either first outer layer 12 or second outer layer 16, which in the view shown in FIG. 3 is initially downward toward second outer layer 16. As shown in FIG. 4, tab 18 is then pulled upward (toward first outer layer 12 in FIGS. 3-4) through slit 20 so that tab 18 is fixed to point upward as shown on the right side of the device 10 in FIG. 2. When tab 18 is pulled through slit 20, the outer points 30 on tab 18 extend along the edges of the device 10 beyond the upper edge of the rectangular form 26.

The construction details of the invention include attaching the layers together to form a laminated sheet as known in the art by gluing, sewing, stapling or heat sealing the two outer layers to reach on to each side of second layer 14, having extra absorbent capacities. Second layer 14 is made of absorbent materials, such as, but not limited to cellulose, fluff pulp, cotton peat or super absorbent polymers which will capture and contain the waste liquid.

The device of the invention may be made of any appropriate size for smaller or larger areas, and may be made in other shapes, such as oval, for particular uses if desired. For a device having a circular shape with a diameter of 19 cm and a thickness of about 7 mm, the arrow-shaped tabs 18 are preferably about 4 cm long and 8 cm at their widest point, and the slit is sufficiently long so that tab 18 can be pulled through the slit.

To use the device of the invention, the planar device with tabs formed in the same plane is converted to a circular planar device with upwardly protruding handles, with each of the tabs 18 formed into a handle as discussed above. Then the device may be placed in a cooking pan, pot or the like in which there is oil or other greasy, fatty or other liquid waste substance so that the waste substance is absorbed into the device. The device may also be used in other environments in which there are liquid waste substances. The preferred device 10 described herein has been tested with cooking oils and absorbs quickly, for example 8 oz (1 cup) of oil is soaked up essentially completely within about 20 seconds. The rate and completeness of absorption of course depends not only on the materials used in the device and the size of the device, but on the type and amount of oil or other waste liquid. After the waste liquid is absorbed, the device is easily lifted from the area where the liquid waste substances were and placed in a proper disposal receptacle, without mess or dripping waste liquid.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. An absorbent device for oils and other waste liquids, comprising an absorbent planar layer having a circular shape and having two outwardly protruding tabs located on opposite sides of the device and being integral and co-planar with the planar layer, wherein the absorbent device has slits cut through the device, through which slits the tabs are pulled to form handles.

2. The absorbent device of claim 1, further comprising a thin outer layer on each side of and parallel to the absorbent planar layer.

3. The absorbent device of claim 2, wherein the thin outer layers are made of absorbent scrim.

4. The absorbent device of claim 1, wherein the tabs are arrowhead shaped.

5. The absorbent device of claim 1, wherein the tabs have a central axis.

6. The absorbent device of claim 5, wherein the slits are located with each slit being positioned on an opposite side of the device near one of the tabs, and wherein each slit has a portion perpendicular to the central axis of the nearest tab, so that the tab may be pulled through the nearest slit to form the handles.

7. The absorbent device of claim 1, wherein each slit comprises a rectangular central portion with three cut sides and two perpendicular side wings extending from each end of the rectangular central portion.

8. The absorbent device of claim 1, wherein the absorbent planar layer is made from a material selected from the group consisting of cellulose, fluff pulp, cotton peat, and super absorbent polymers to capture and contain waste liquids.

* * * * *